(12) United States Patent
Chen

(10) Patent No.: US 6,774,503 B1
(45) Date of Patent: Aug. 10, 2004

(54) WHEEL HAVING AN ACCELERATING ELECTRICITY CHARGING DEVICE

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/702,463

(22) Filed: Nov. 7, 2003

(51) Int. Cl.[7] .................................................. B60Q 1/26
(52) U.S. Cl. ..................... 290/1 R; 290/1 C; 362/500
(58) Field of Search ..................... 290/1 C; 310/67 A, 310/75 C; 362/500

(56) References Cited

U.S. PATENT DOCUMENTS

| | | | | |
|---|---|---|---|---|
| 4,193,223 A | * | 3/1980 | D'Andrade et al. | 446/438 |
| 4,445,297 A | * | 5/1984 | D'Andrade et al. | 446/438 |
| 4,974,124 A | * | 11/1990 | Wu | 362/475 |
| 5,873,600 A | * | 2/1999 | Conway | 280/816 |
| 5,932,943 A | * | 8/1999 | Werner et al. | 310/67 A |
| 6,386,731 B1 | * | 5/2002 | Cheng | 362/192 |
| 6,398,381 B1 | * | 6/2002 | Tseng | 362/96 |
| 6,398,395 B1 | * | 6/2002 | Hyun | 362/500 |
| 6,588,913 B1 | * | 7/2003 | Huang | 362/96 |
| 6,703,716 B2 | * | 3/2004 | Chiu | 290/1 R |

* cited by examiner

Primary Examiner—Nicholas Ponomarenko
Assistant Examiner—H. Elkassabgi
(74) Attorney, Agent, or Firm—Rosenberg, Klein & Lee

(57) ABSTRACT

A wheel having an accelerating electricity charging device includes a wheel, an accelerating gear set, a shaft sleeve, a generator, and a shaft. The wheel comprises an inner gear. The accelerating gear set comprises a pair of driving gears, a driven gear and a fixing plate. The driving gears mesh with the driven gear and are secured on the fixing plate. The shaft sleeve is inserted through the driven gear. The generator comprises a magnet and a coil. The magnet of the generator is secured to one end of the shaft sleeve with the shaft inserting through the shaft sleeve and the magnet inserted through the coil. The shaft is provided with engaging surfaces engaged with the hole of the fixing plate.

3 Claims, 5 Drawing Sheets

B-B

WHEEL HAVING AN ACCELERATING ELECTRICITY CHARGING DEVICE

FIELD OF THE INVENTION

This invention relates to a wheel having an accelerating electricity charging device, and more particularly to use a differential gear ratio to accelerate charging process.

BACKGROUND OF THE INVENTION

In order to attract consumers, manufacturers have incorporated illumination devices on their products, such as scooters, tricycles, baby carts, toy carts, roller skates, and so on. These illumination devices utilize their wheels rolling to generate electricity to the illumination devices. However, when the wheel rolls slowly, the electricity power is weak. As a result the lighting effect of the illumination devices is not conspicuous.

SUMMARY OF THE INVENTION

It is the primary advantage of the president invention to provide a wheel having an accelerating electricity charging device, which charges at a faster speed.

It is another advantage of the present invention to provide the wheel having an accelerating electricity charging device, which is more reliable.

DETAILED DESCRIPTION OF THE PREFERRED EMBODIMENTS

Figure 1:
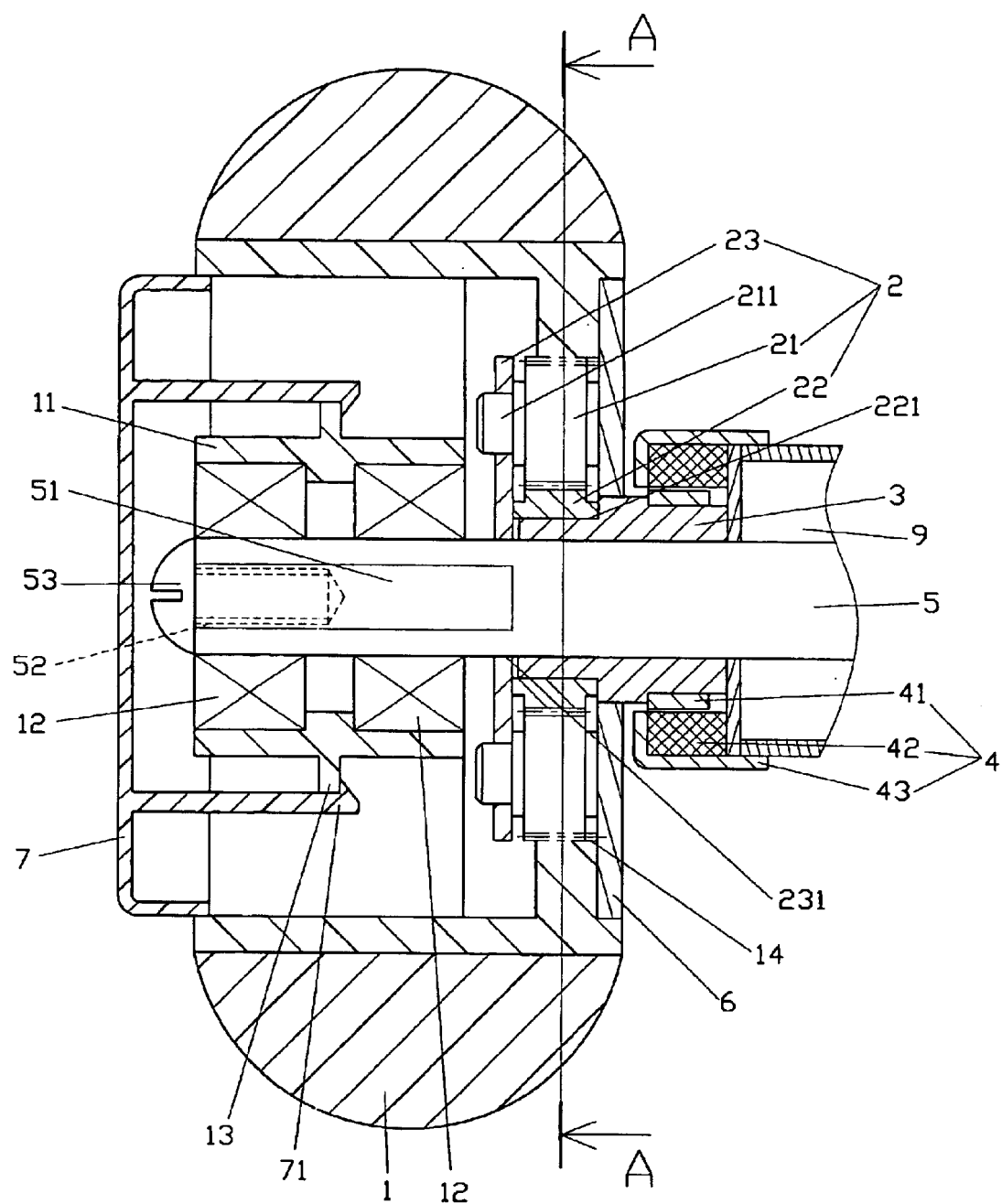
FIG. 1 is a side cross-sectional view of the present invention.
Figure 2:
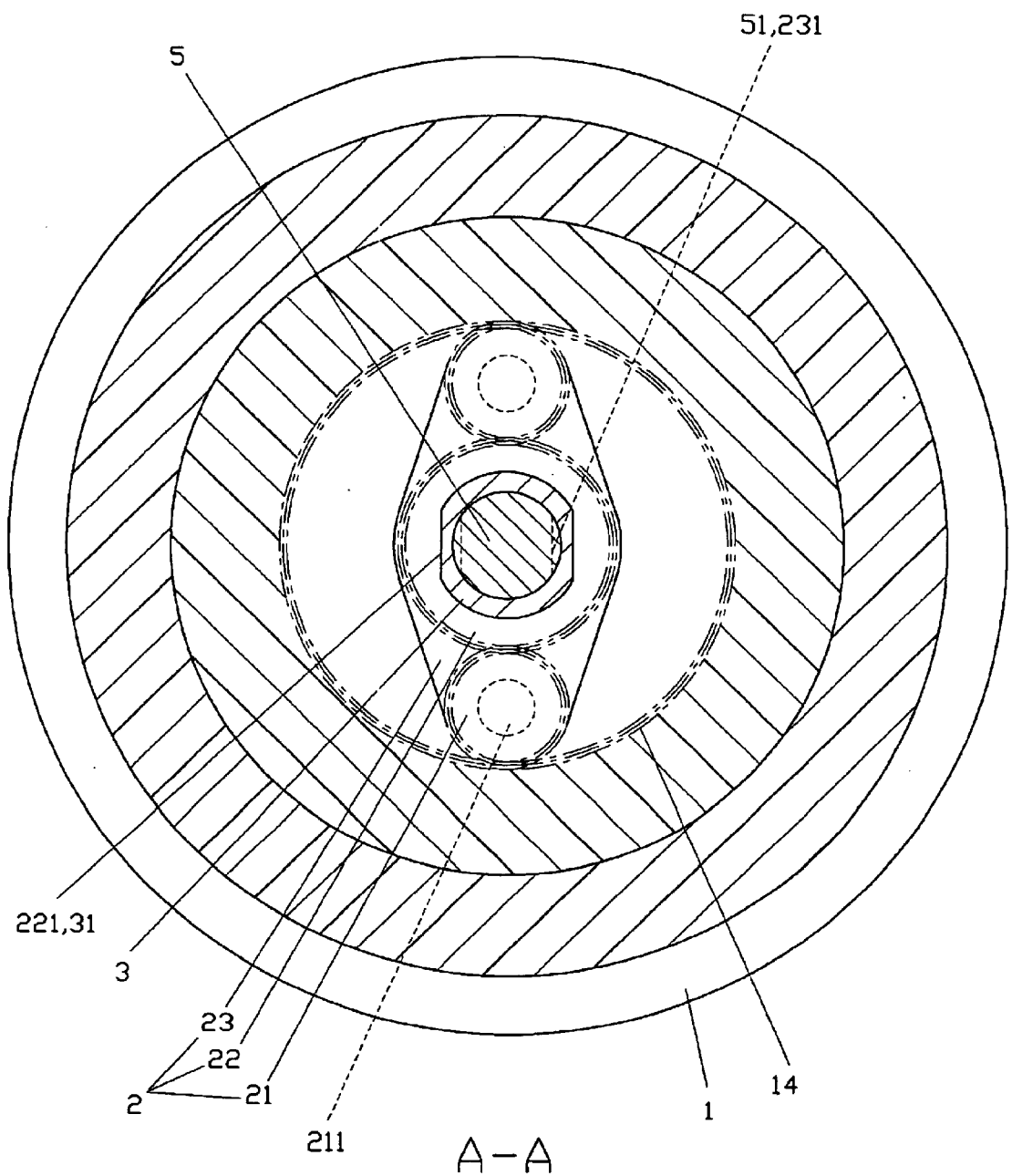
FIG. 2 is a cross sectional-view taken along line A—A of FIG. 1.

The present invention comprises a wheel 1, an accelerating gear set 2, a shaft sleeve 3, a generator 4, a shaft 5, an inner cover 6, an outer cover 7, a wheel ring 8, and a body 9, as shown in FIG. 1.

The wheel 1 is connected to one side of the body 9 which can be a scooter, tricycle, baby stroller, toy cart, roller skate, shopping cart, bike or any other device with wheels to roll.

The wheel 1 has a hollow tube 11 at a center portion of one side thereof and extends a rib 13 therefrom. The hollow tube 11 is adapted to receive a pair of bearings 12 therein. The other side of the wheel 1 is formed with an inner gear 14 along the inner wall of the wheel 1.

The accelerating gear set 2 comprises a pair of driving gears 21, a driven gear 22 and a fixing plate 23. Each driving gear 21 meshes with the inner gear 14 of the wheel 1 and extends a stud 211 inserted into the fixing plate 23. The fixing plate 23 includes a hole 231 having two flat sides. The driven gear 22 is secured between the two driving gears 21 and meshes with the driving gears 21. The driven gear 22 also includes a hole 221 having two flat sides thereof.

The shaft sleeve 3 is a hollow tube with a pair of flat surfaces 31 corresponding in shape to the hole 221 of the driven gear 22.

The generator 4 includes a magnet 41 and a coil 42. The coil 42 is covered with a hollow sleeve 43 and secured to the body 9.

The shaft 5 comprises a pair of engaging surfaces 51 corresponding to the hole 231 of the fixing plate 23, and a threaded hole 52 at the end to secure a bolt 53 therein.

The inner cover 6 is a thin panel. The outer cover 7 has a bulged portion and a hook 71 extending towards the center portion thereof.

To assemble the present invention, the driving gears 21 of the accelerating gear set 2 are meshed with the driven gear 22 and secured on the fixing plate 23. The driving gears 21 are meshed with the inner gear 14 of the wheel 1. The inner cover 6 is covered from the inner side of the wheel 1. The shaft sleeve 3 is inserted through the hole 221 of the driven gear 22 of the accelerating gear set 2. The magnet 41 of the generator 4 is secured onto the shaft sleeve 3. The coil 42 of the generator 4 is secured to the body 9 with the sleeve 43.

Upon completion of the assembly, the shaft 5 is inserted into the body 9 through the coil 42, the shaft sleeve 3, the hole 231 of the fixing plate 23 of the accelerating gear set 2, and the tube 11 of the wheel 1, and then secured by the bolt 53 thereat. The engaging surfaces 51 at respective sides of the shaft 5 are engaged with the hole 231 of the fixing plate 23. This secures the fixing plate 23 on the shaft 5. The hook 71 of the outer cover 7 is lodged into the rib 13 of the wheel 1 so as to hide the accelerating gear set 2 in the wheel 1.

In practice, when rotating the wheel 1, the inner gear 14 links the driving gears 21 of the accelerating gear set 2 to rotate. The hole 231 of the fixing plate 23 is secured with the engaging surfaces 51 of the shaft 5, which secures the accelerating gear set 2 to the shaft 5. The driving gears 21 are linked by the inner gear 14 of the wheel 1 to rotate the driven gear 22. Due to driving gears 21 have less teeth than that of the inner gear 14 and the teeth and rotating speed are in reverse ratio, therefore, it increases the rotating speed of the driving gears 21, which links the driven gear 22 to increase its rotating speed as well. This links the magnet 41 to rotate with respect to the coil 42 at a faster speed, even the wheel 1 rotates at a slower speed. The differential teeth ratio of the accelerating gear set 2 will link the magnet 41 of the generator 4 to rotate at a faster speed and to generate electricity power in short time without any deficiency.

Figure 3:
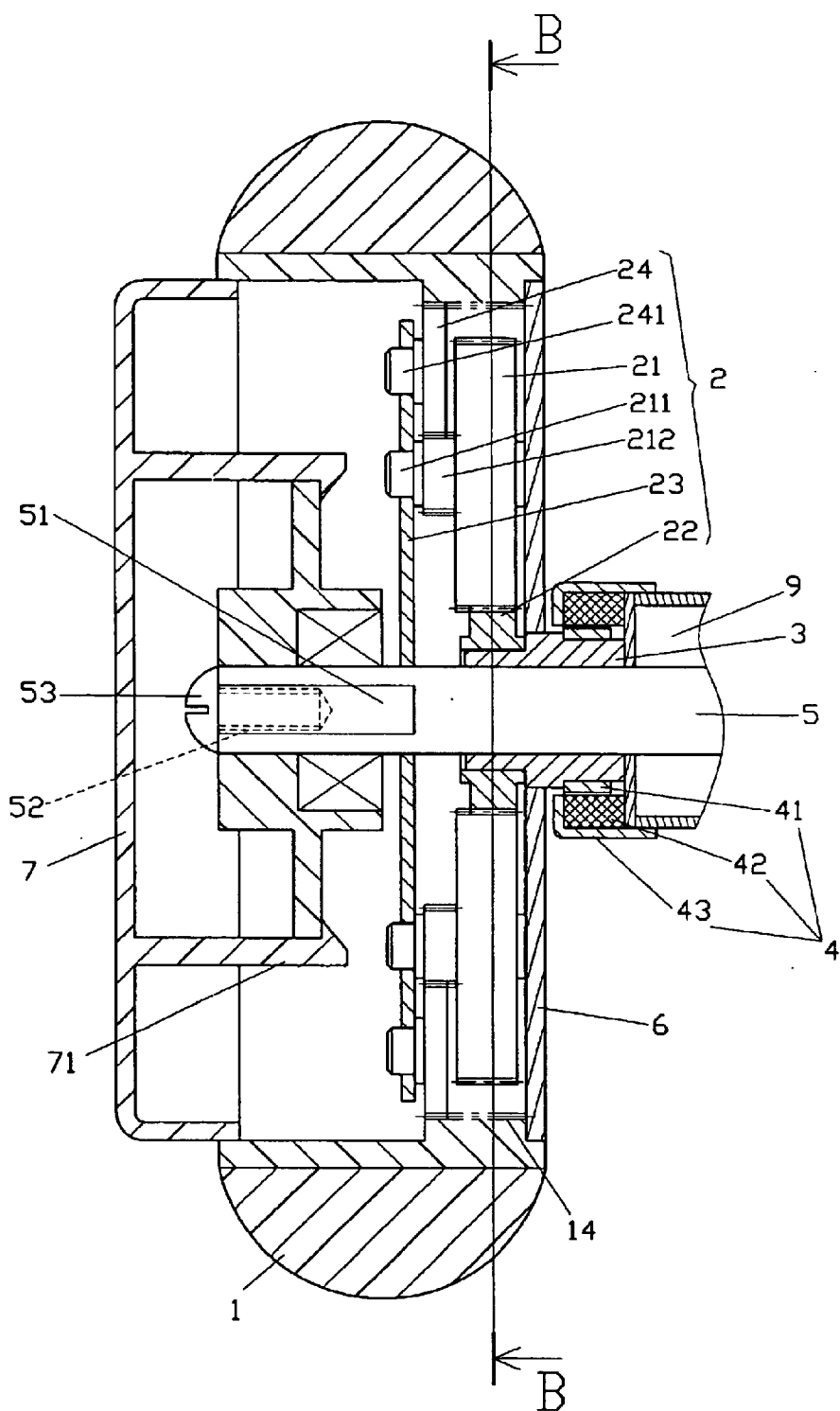
FIG. 3 is a side cross-sectional view of a second embodiment of the present invention.
Figure 4:
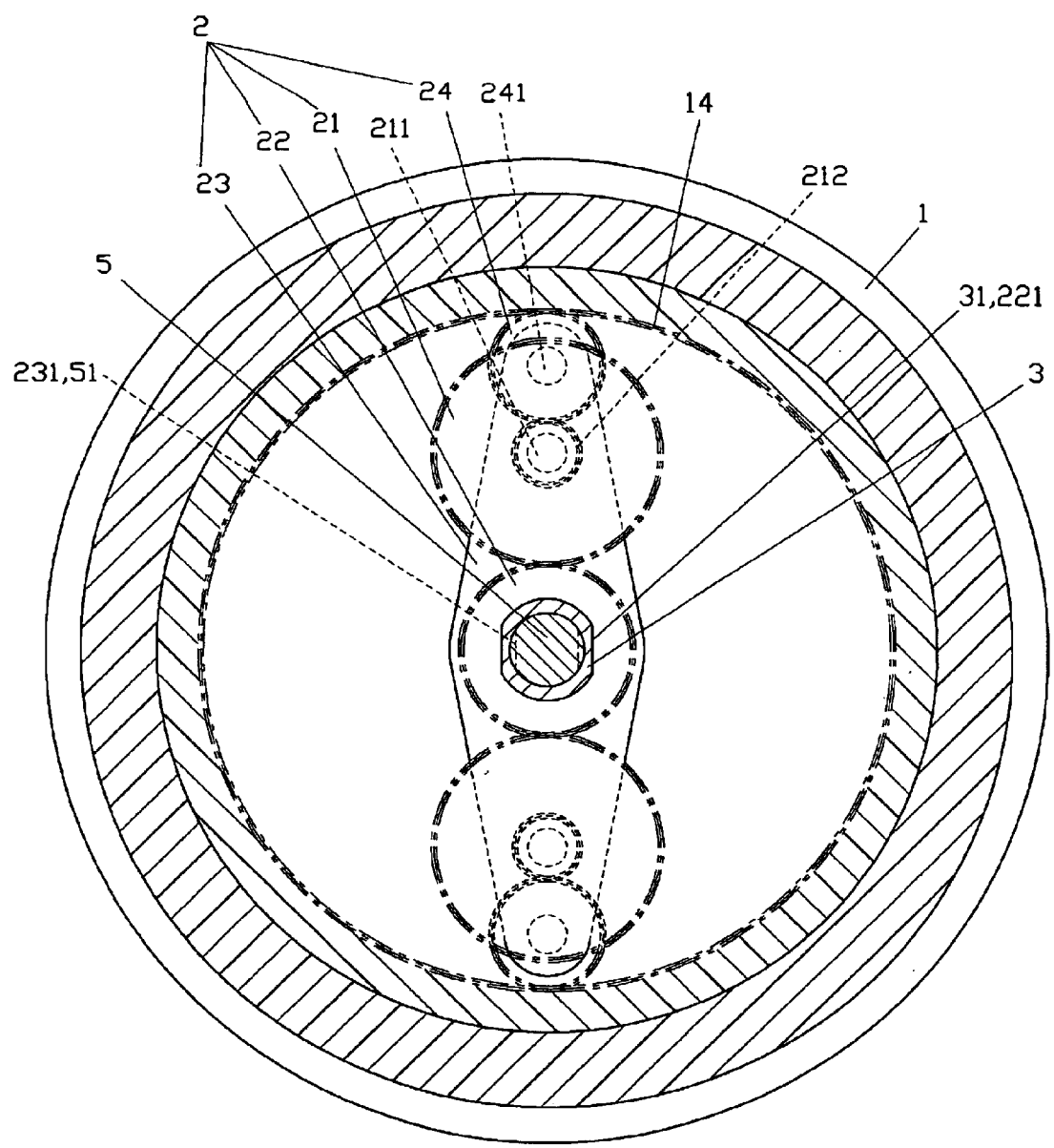
FIG. 4 is a cross-sectional view taken along line B—B of FIG. 3.

Further, to make the generator more efficient, as shown in FIGS. 3 and 4, a second embodiment of the present invention comprises a wheel 1, an accelerating gear set 2, a shaft sleeve 3, a generator 4, a shaft 5, an inner cover 6 and an outer cover 7. The accelerating gear set 2 comprises a pair of driving gears 21, a driven gear 22, a fixing plate 23, and a pair of transferring gears 24.

Each transferring gear 24 has a shaft 241 at the center portion thereof and is secured to the fixing plate 23. The transferring gears 24 are meshed with the inner gear 14 of the wheel 1. The stud 211 of each driving gear 21 of the accelerating gear set 2 has bulged meshing teeth 212 to mesh with a respective transferring gear 24 whereas the teeth on the outer surface of each driving gear 21 mesh with the driven gear 22.

In practice, due to the differential gear ratio, the rotation of the transferring gears 24 is faster, which then links with the driving gears 21 by meshing with the teeth 212 to rotate at an accelerating speed. The driven gear 22 is linked to rotate in a further accelerating speed. The shaft sleeve 3 in the driven gear 22 is also rotated at a faster speed, which brings the magnet 41 to rotate with respect to the coil 42 at a same speed to increase the generating electricity power.

Figure 5:
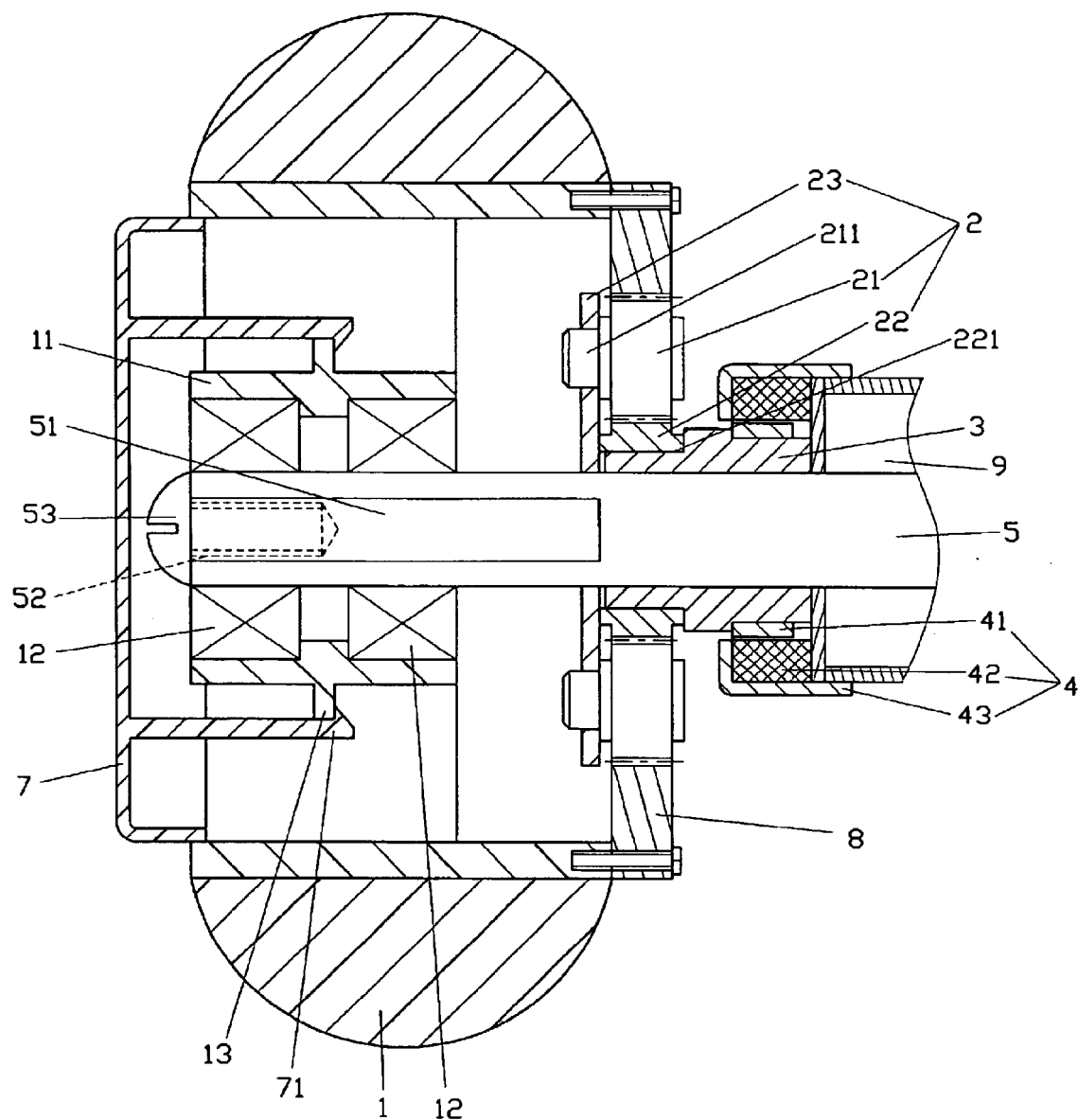
FIG. 5 is a side cross-sectional view of a third embodiment of the present invention.

As shown in FIG. 5, the inner gear 14 of the wheel 1 may be replaced by a separated wheel ring 8 secured to one side of the wheel 1. The wheel ring 8 comprises inner teeth to mesh with the accelerating gear set 2. This also produces the same effect.

I claim:

1. A wheel having an accelerating electricity charging device comprising a wheel, an accelerating gear set, a shaft sleeve, a generator, and a shaft, said wheel comprising inner gear therein;

said accelerating gear set comprising a pair of driving gears, a driven gear and a fixing plate, said driving gears meshing with said inner gear of said wheel, each driving gear extending a stud from a center portion and secured on said fixing plate, said fixing plate comprising a hole having two flat sides, said driven gear meshing with said driving gears and comprising a hole at a center thereof for said shaft sleeve to insert therein;

said shaft sleeve being a hollow tube with a pair of flat surfaces corresponding in shape to said hole of said driven gear;

said generator comprising a magnet and a coil, said coil being covered with a hollow sleeve;

said shaft comprising engaging surfaces corresponding to said hole of said fixing plate;

said accelerating gear set being secured within said wheel, said magnet of said generator being secured to one end of said shaft sleeve, when inserting said shaft through said wheel, said engaging surfaces of said shaft being engaged with said hole of said fixing plate, when said driving gears rotating with respect to said wheel, said driven gear being linked to rotate, said magnet of said generator secured on said shaft sleeve rotating with respect to said coil to generate electricity power.

2. The wheel having an accelerating electricity charging device, as recited in claim 1, wherein said accelerating gear set comprises a pair of transferring gears, and said stud of each driving gear is formed with meshing teeth to mesh with said transferring gears, said transferring gears meshing with said inner gear of said wheel and said driving gears to rotate said driven gear.

3. The wheel having an accelerating electricity charging device, as recited in claim 1, wherein said inner gear of said wheel is formed separately with a wheel ring secured to one side of said wheel.

\* \* \* \* \*